US011447275B1

(12) United States Patent
Mustafi et al.

(10) Patent No.: US 11,447,275 B1
(45) Date of Patent: Sep. 20, 2022

(54) PASSIVE CRYOGEN STORAGE SYSTEM

(71) Applicant: United States of America as represented by the Administrator of NASA, Washington, DC (US)

(72) Inventors: Shouvanik Mustafi, Greenbelt, MD (US); Matthew Francom, Greenbelt, MD (US); Xiaoyi Li, Greenbelt, MD (US); Daniel McGuinness, Greenbelt, MD (US); Ryan Simmons, Greenbelt, MD (US); Lloyd Purves, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 347 days.

(21) Appl. No.: 16/841,800

(22) Filed: Apr. 7, 2020

(51) Int. Cl.
*B64G 1/40* (2006.01)
*F17C 13/00* (2006.01)
*B64G 1/58* (2006.01)
*B64G 1/54* (2006.01)

(52) U.S. Cl.
CPC ............ *B64G 1/402* (2013.01); *F17C 13/001* (2013.01); *F17C 13/008* (2013.01); *B64G 1/54* (2013.01); *B64G 1/58* (2013.01); *F17C 2201/0128* (2013.01); *F17C 2203/0308* (2013.01); *F17C 2203/0366* (2013.01); *F17C 2203/0387* (2013.01); *F17C 2203/0663* (2013.01); *F17C 2221/011* (2013.01); *F17C 2221/012* (2013.01); *F17C 2223/0161* (2013.01); *F17C 2270/0194* (2013.01); *F17C 2270/0197* (2013.01)

(58) Field of Classification Search
CPC .......... B64G 1/401; B64G 1/402; B64G 1/14; B64G 1/54; B64G 1/58; F17C 2205/0107; F17C 2205/0192; F17C 2270/0194; F17C 2270/0197; F17C 13/001; F17C 13/008; F17C 2201/0128; F17C 2203/0308; F17C 2203/0366; F17C 2203/0338; F17C 2203/0667; F17C 2221/011; F17C 2221/012; F17C 2223/0161
See application file for complete search history.

(56) References Cited

U.S. PATENT DOCUMENTS 4,451,017 A * 5/1984 Marshall ................ B64G 1/002
244/172.3
6,267,330 B1 * 7/2001 Cochran ................ B64G 1/402
244/172.2

(Continued)

FOREIGN PATENT DOCUMENTS

CN 112555680 A * 3/2021

*Primary Examiner* — Shawn M Braden
(74) *Attorney, Agent, or Firm* — Christopher O. Edwards; Bryan A. Geurts; Helen M. Gaius

(57) ABSTRACT

A passive insulating tank support structure includes a first interface ring mounted to a first tank, a first support ring surrounding and spaced apart from the first interface ring, a second interface ring mounted to a second tank, a plurality of first struts coupling the first and second interface rings, a plurality of second struts coupling the first support ring and second interface ring, a plurality of third struts coupling the first support ring and a first heat source, a third interface ring mounted to the second tank, and a plurality of fourth struts coupling the third interface ring and a second heat source.

18 Claims, 3 Drawing Sheets

(56) References Cited

U.S. PATENT DOCUMENTS

| | | | |
|---|---|---|---|
| 7,559,508 B1 * | 7/2009 | Taylor | B64G 1/242 |
| | | | 244/172.3 |
| 2008/0237099 A1 * | 10/2008 | Behruzi | F17C 13/088 |
| | | | 210/151 |
| 2016/0200457 A1 * | 7/2016 | Droppers | F02K 9/58 |
| | | | 244/171.1 |
| 2018/0202786 A1 * | 7/2018 | Korach | F02K 9/605 |
| 2020/0108954 A1 * | 4/2020 | Weathers | B64G 1/641 |

* cited by examiner

PASSIVE CRYOGEN STORAGE SYSTEM

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

FIELD

The present disclosure relates to cryogen storage and more specifically to thermal isolation techniques that enable long term cryogen storage.

BACKGROUND

Long term storage of cryogens has many applications on Earth and in space. For example, liquid hydrogen (LH2) and liquid oxygen (LO2) cryogenic propellants can dramatically enhance the ability to explore the solar system due to their superior specific impulse (Isp) capability. Although these cryogenic propellants allow significant mass advantages over traditional hypergolic propulsion systems, they can be extremely challenging to manage and store, especially for long periods of time.

Cryogens are typically stored using active techniques, for example, using energized cooling devices such as cryocoolers and refrigerators, and passive techniques such as passive thermal isolation systems. Cryogens are usually stored at temperatures that are significantly lower than their surroundings, and as a result, they are almost always heat sinks that absorb heat. This heat may vaporize the cryogen thus losing the very commodity that is being stored. This cryogen loss can be expensive on Earth, but in space the loss of cryogen can lead to even more expensive mission reduction or even mission loss. Current state of the art storage strategies may use thermally insulating steel, cryogenically resilient fiberglass like G10 to provide conductive isolation, insulation foam or vacuum jackets to provide convective isolation, and conventional Multi-Layer Insulation (cMLI) to provide radiative isolation. Active cooling systems may also be used to store cryogens. These cryogen storage strategies either provide less than desired performance, allowing more heat to reach the stored cryogen, or are less mass and energy efficient, requiring massive vacuum jackets or larger cryocoolers and refrigerators, or both. The less than desired performing materials, along with the mass and energy inefficiencies of current techniques make Earth based cryogen storage systems more expensive to operate and maintain, and exact mass and power penalties that make spaced based cryogen storage systems much more expensive and significantly restrict mission possibilities.

SUMMARY

In some instances, the disclosed passive cryogen storage techniques may be an alternative to active cooling systems, However, in situations where an active cooling system is necessary, it would be useful for the active cooling system to be used in conjunction with disclosed passive cryogen storage techniques to reduce the thermal demands on the active cooling system. The disclosed passive storage techniques alone, or in combination with active storage strategies, generally enhance long term storage of cryogens. The disclosed techniques generally provide improved conductive, convective, and radiative isolation.

In at least one aspect, the disclosed embodiments are directed to a passive insulating tank support structure including a first interface ring mounted to a first tank, a first support ring surrounding and spaced apart from the first interface ring, a second interface ring mounted to a second tank, a plurality of first struts coupling the first and second interface rings, a plurality of second struts coupling the first support ring and second interface ring, a plurality of third struts coupling the first support ring and a first heat source, a third interface ring mounted to the second tank, and a plurality of fourth struts coupling the third interface ring and a second heat source.

In at least one other aspect, the disclosed embodiments are directed to a passive insulating tank support structure for a spacecraft having a first propellant tank with a first interface ring mounted thereto, a second propellant tank with second and third interface rings mounted thereto, a plurality of first struts coupling the first and second interface rings, a first support ring surrounding and spaced apart from the first interface ring, a plurality of second struts coupling the first support ring and the second interface ring, a plurality of third struts coupling the first support ring and a spacecraft bus section, and a plurality of fourth struts coupling the third interface ring and a spacecraft engine section.

DETAILED DESCRIPTION

Figure 1:
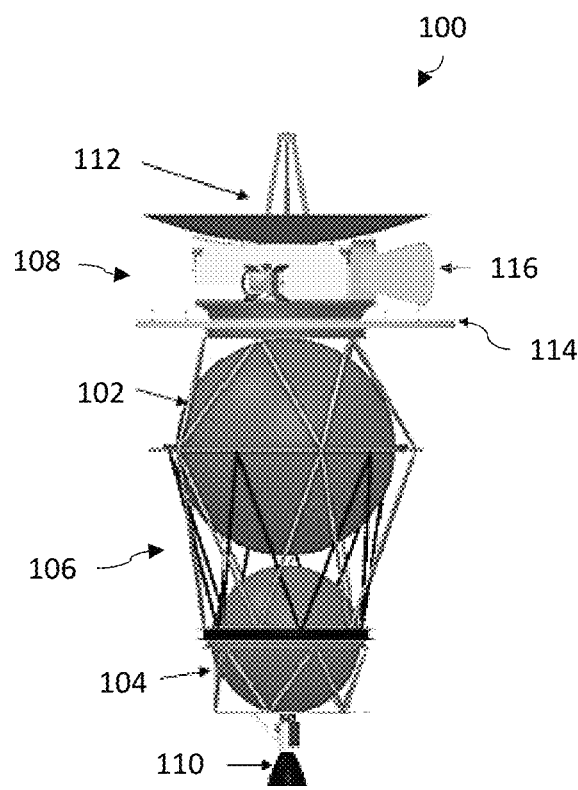
FIG. 1 shows an exemplary spacecraft incorporating the disclosed embodiments.

FIG. 1 shows an exemplary spacecraft 100 that depicts an overview of the disclosed embodiments. The exemplary spacecraft includes a novel arrangement of tanks, for example, cryogenic propellant tanks, and a low thermal conductivity support structure that significantly reduces conduction and allows for long term storage and use of cryogenic propellants for space exploration. The exemplary spacecraft 100 may include a first tank 102, a second tank 104, a tank support structure 106, a first heat source 108, and a second heat source 110. The space craft may also include an antenna and radar system 112, a sunshade 114, and an imager 116.

According to the disclosed embodiments, the first and second tanks may be cryogenic propellant tanks. In at least one embodiment, the first tank 102 may be configured to hold a lower density cryogenic propellant at a lower temperature than the second tank 104. This may be achieved by configuring the first tank 102 with a relatively larger volume than the second tank 104 and cooling the cryogenic propellant in the first tank 102 to a lower temperature than the normal boiling point of the cryogen in the first tank, for example, approximately 16 K before launch.

Figure 2:
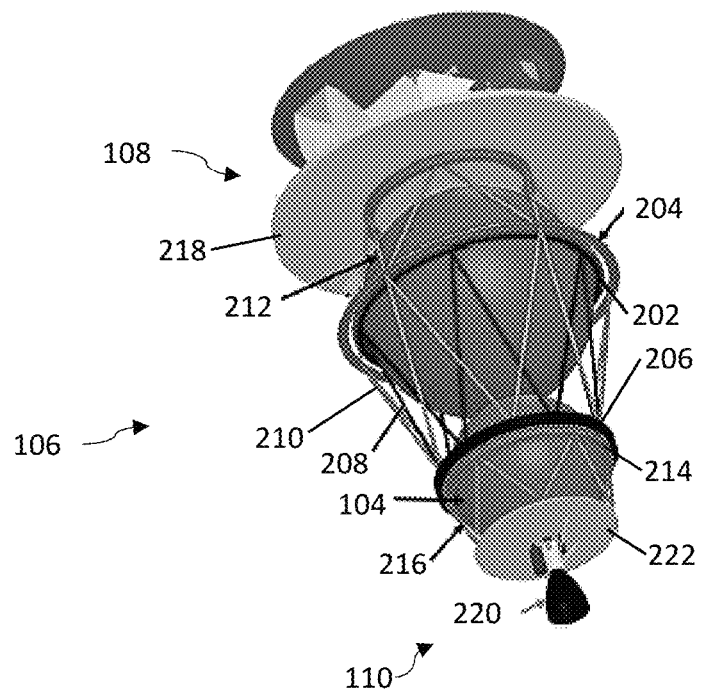
FIG. 2 illustrates a perspective view of the exemplary spacecraft.

FIG. 2 shows a perspective view of the exemplary spacecraft 100 depicting the tank support structure 106. The tank support structure 106 may passively insulate the tanks by providing a tortuous conductive path from the first heat source 108, to the second tank 104, and then from the second tank 104 to the first tank 102, thus limiting conduction from the first heat source 108 to both the second tank 104 and the first tank 102.

The tank support structure 106 may include a first interface ring 202 mounted to the first tank 102, and a first support ring 204 surrounding and spaced apart from the first interface ring 202. A second interface ring 206 may be mounted to the second tank 104, a plurality of first struts 208 may couple the first and second interface rings, and a plurality of second struts 210 may couple the first support ring 204 and the second interface ring 206. A plurality of third struts 212 may couple the first support ring 204 and the first heat source 108.

A third interface ring 214 may be mounted to the second tank 104, and a plurality of fourth struts 216 may couple the third interface ring 214 and the second heat source 110. The first, second, third, and fourth struts may be fabricated from a carbon fiber modified cyanate ester prepreg resin composite and may be sized to balance both structural and thermal requirements.

In another embodiment, the first tank 102 may be referred to as a first propellant tank and the second tank 104 may be referred to as a second propellant tank. The first heat source 108 may be referred to as a spacecraft bus section, which may include the antenna and radar system 112, sunshade 114, imager 116, a power supply, and an interface plate 218 to which the third struts 212 are coupled. The second heat source 110 may be referred to as a spacecraft engine section, which may include a spacecraft engine 220 an engine mounting plate 222 to which the fourth struts 216 are coupled. The passive insulating tank support structure for the spacecraft may be described as including the first propellant tank 102 on which the first interface ring 202 may be mounted, the second propellant tank 104, interposed between the first propellant tank 102 and the spacecraft engine section 110, on which the second 206 and third 214 interface rings may be mounted, and a plurality of the first struts 208 which may couple the first and second interface rings.

The support structure for the spacecraft may further include the first support ring 204 surrounding and spaced apart from the first interface ring 202, with the plurality of second struts 210 coupling the first support ring 204 and the second interface ring 206. A plurality of the third struts 212 may couple the first support ring 204 and the spacecraft bus section 108, and a plurality of the fourth struts 216 may couple the third interface ring 214 and the spacecraft engine section 110.

In an embodiment where the first tank 102 holds liquid hydrogen, the second tank 104 holds liquid oxygen, the first heat source 108 is a spacecraft bus section, and the second heat source 110 is a spacecraft engine section, the arrangement of K" allows for the lower temperature liquid hydrogen tank 102, which may have a normal boiling point (NBP) of approximately 20 K and may be subcooled to approximately 16 K, to be conductively isolated from both the spacecraft engine section 110 and the spacecraft bus section 108. This is advantageous because in space, the spacecraft engine section 110 and the spacecraft bus section 108 may be at temperatures above 300 K. The arrangement is further advantageous because the liquid oxygen tank 104 may have an NBP of approximately 90 K and may further isolate the lower temperature liquid hydrogen tank 102 from the 300 K spacecraft engine section 110.

The smaller, but more massive when full, liquid oxygen tank 104 may be generally located toward one end of the insulating tank support structure 100, and the larger, but lighter when full, liquid hydrogen tank 102 may be located toward an opposite end of the insulating tank support structure 100. The spacecraft bus section 108 is indirectly coupled with the second interface ring 206 mounted on the higher temperature liquid oxygen tank 104 and the third interface ring 214 is coupled to the spacecraft engine section 110. The first interface ring 202 is mounted on the liquid hydrogen tank 102 and structurally supports the liquid hydrogen tank 104 with the first struts 208 that extend from the second interface ring 206 to the first interface ring 202. The first support ring 204 surrounding and spaced apart from the first interface ring 202 does not contact the liquid hydrogen tank 102 but serves as a transition ring that allows the spacecraft bus section 108 to be connected to the second interface ring 206 mounted to the liquid oxygen tank 104, by way of the third struts 212, the first support ring 204, and the second struts 210.

Figure 3:
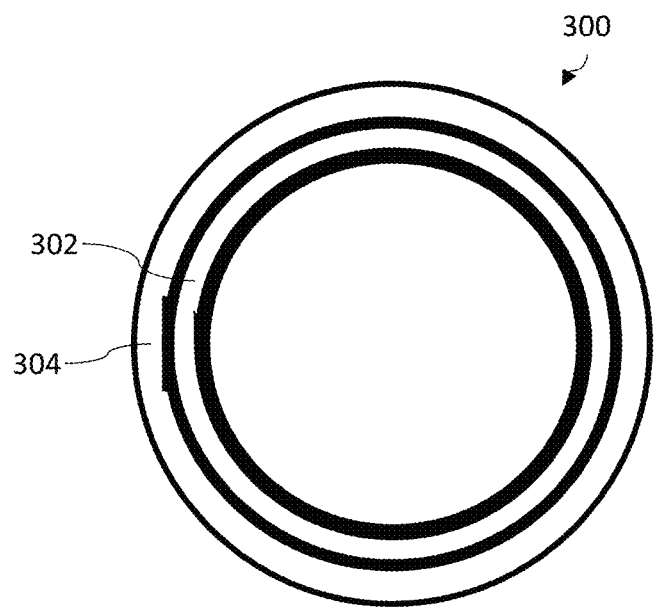
FIG. 3 shows a schematic cross sectional diagram of an exemplary propellant tank.

To reduce convection and radiation, both tanks may be covered with various types of isolating covers on the launch pad and in space. FIG. 3 shows a schematic cross sectional diagram of an exemplary propellant tank 300. Because convective heat transfer is a dominant source of heat transfer at the Launchpad, in order to reduce convection at the launch pad, both tanks may include a cover of load responsive multiple layer insulation (LRMLI) 302, which may include layers of metalized polymer thermal shields holding a vacuum, separated and supported by low thermal conductance spacer posts. The spacer posts support the metalized polymer thermal shields holding a vacuum in air, providing a thin, lightweight, flexible vacuum shell. As atmospheric pressure is reduced in space, the spacer posts disconnect from the metalized polymer thermal shields resulting in lower heat leak. Because radiative heat transfer is a dominant source of heat transfer in space, in order to reduce radiative heat transfer in space, both tanks may include a cover of integrated multiple layer insulation (IMLI) 304, which may be made up of multiple layers of thin metal coated plastic, spaced apart with polymer spacers. In most applications the LRMLI 302 will provide most of the thermal isolation by reducing convective heat transfer at the launch pad, and IMLI will be providing most the thermal isolation by reducing radiative heat transfer in space. This is because convective heat transfer is a dominant source of heat transfer at the launch pad and radiative heat transfer is a dominant source of heat transfer in space.

As mentioned above, the spacecraft bus section 108 may include a sunshade 114. The spacecraft 100 will normally point such that the spacecraft bus 108 is facing the sun and the sunshade 114 may operate to separate the warmer spacecraft bus section from the colder tanks 102, 104 and spacecraft engine section 110. However the measures taken to reduce conduction, convection, and radiation allow tolerance of sun views and increased heat input during short durations for engine burn and communication maneuvers. This arrangement also allows sufficient view to space for both the liquid oxygen tank 104 and the liquid hydrogen tank. As long as the tanks have views to deep space for significant periods of time, the views to space for the tanks may be sufficient such that the liquid oxygen tank 104 actually cools down during space flight and the heat leak into the liquid hydrogen tank is considerably diminished.

In order the minimize liquid hydrogen tank loss by phase-change, the liquid hydrogen may be subcooled before launch, for example, to approximately 16 K and may be pressurized, for example, to approximately 1 atm while on the ground prior to launch. This may be achieved using cryogen subcooling techniques.

Figure 4:
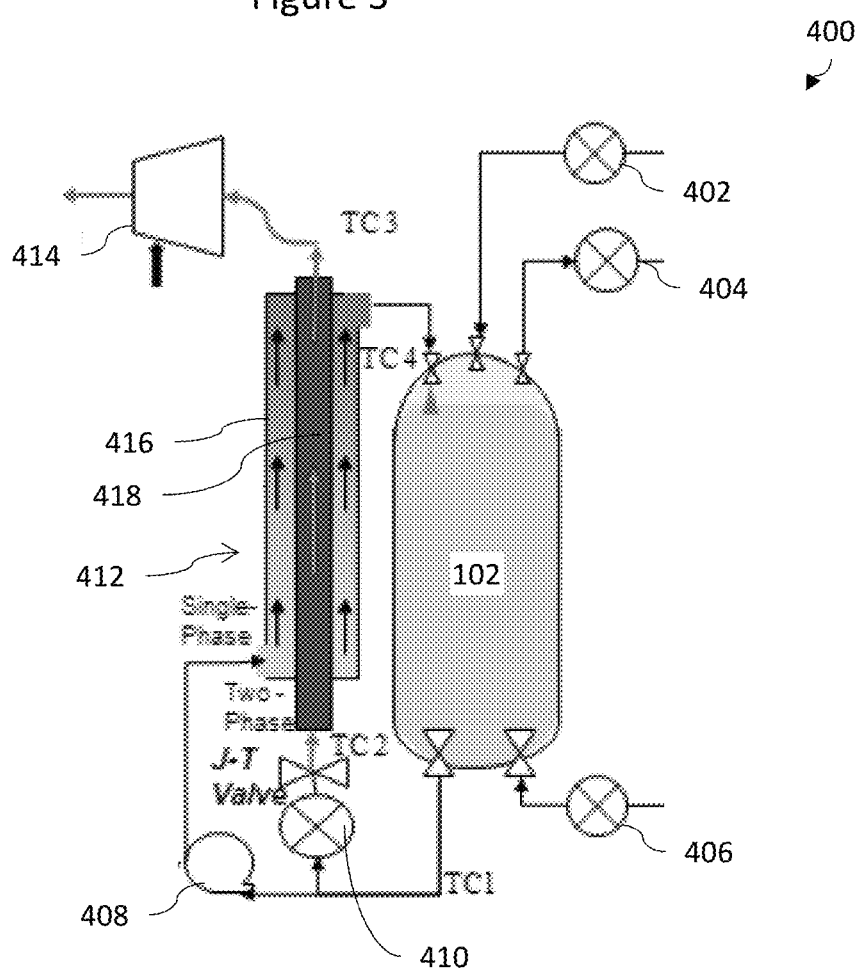
FIG. 4 illustrates an example of an optional cryogen subcooling system for use with the disclosed embodiments.
Figure 5:
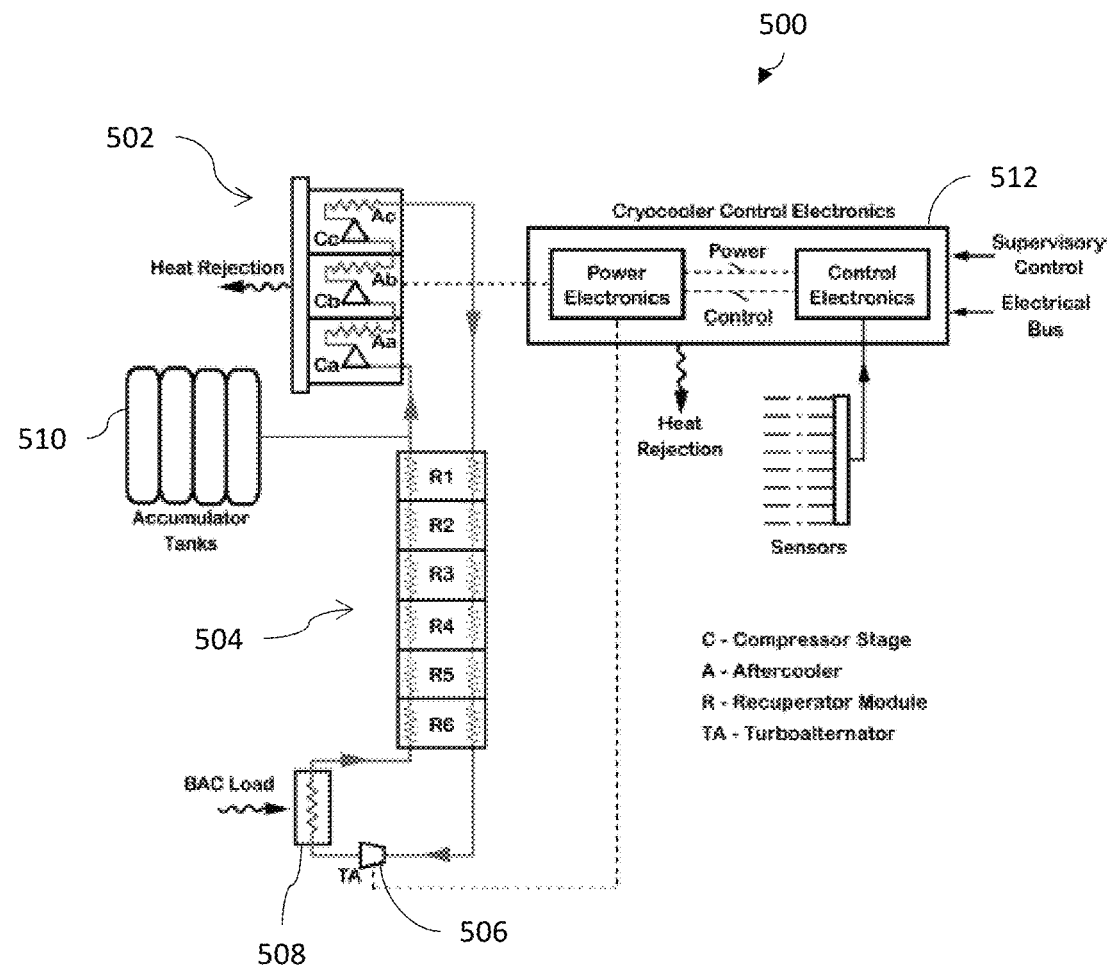
FIG. 5 illustrates an example of an optional cryocooler system for use with the disclosed embodiment.

FIG. 4 and FIG. 5 illustrate examples of cryogen subcooling systems 400, 500 that may be used in combination with the disclosed passive cooling system when additional cryogen cooling is necessary. It should be understood that the examples of subcooling systems described are only examples, and that any suitable cryogen subcooling systems or techniques may be used, such as mechanical coolers, stored cryogen coolers, heat exchangers with lower temperature cryogens, etc., and that in some applications the cryogen subcooling systems may be part of ground support equipment.

The example cryogen subcooling system of FIG. 4 may utilize the thermodynamic capabilities of the stored cryogen itself to achieve subcooling. The cryogen subcooling system may include a helium fill valve 402 connected to a helium source, a vent valve 404, a liquid hydrogen fill valve 406, a hydrogen fill valve 406 connected to a hydrogen source, a cryogenic liquid pump 408, a Joule Thompson (J-T) valve 410, a heat exchanger 412, and a compressor 414. Hydrogen is pumped from the tank 104 and through an outside tube 416 of the heat exchanger 412 exchanger and cooled by hydrogen from the tank 102 is enthalpicly expanded by the J-T valve. The hydrogen in the center tube 418 will increase in vapor quality along the center tube 418 until it vaporizes and may be vented to a flare stack through the compressor 414. The subcooled hydrogen at the end of the outside tube 416 may be fed back into the hydrogen tank 102 and the vented hydrogen may be replaced by a supply of make-up liquid hydrogen through the liquid hydrogen fill valve 406.

FIG. 5 illustrates another example of a cryogen subcooling system 500 for applications that may have the mass and power budget to implement a cryocooler system. The cryocooler system 500 may be used to cool a number of different types of cryogens, for example, hydrogen, oxygen, methane, etc. The cryocooler system 500 may include centrifugal compressors 502 plumbed in series and having built in aftercoolers, a recuperator 504, a turbine 506, a broad area cooling load interface 508 that extracts heat from the cryogen tank, accumulator tanks 510 and control electronics 512. High-pressure gas leaving the compressors 502 enters the recuperator 504 and may be precooled by a low pressure stream returning from a cold end of the broad area cooling load interface 508. After exiting the recuperator 504 the high pressure cycle gas expands through the turbine 506. The turbine exit flow is then routed to the broad area cooling load interface 508 where the cycle gas absorbs heat from the cryogen tank before returning to the recuperator 504. The accumulators 510 may be used to limit the maximum pressure in the cryocooler at room temperature.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A passive cryogen storage system comprising:
an insulating tank support structure including:
a first interface ring mounted to a first tank;
a first support ring surrounding and spaced apart from the first interface ring;
a second interface ring mounted to a second tank;
a plurality of first struts coupling the first and second interface rings;
a plurality of second struts coupling the first support ring and second interface ring;
a plurality of third struts coupling the first support ring and a first heat source;
a third interface ring mounted to the second tank; and
a plurality of fourth struts coupling the third interface ring and a second heat source.

2. The passive cryogen storage system of claim 1, wherein the first tank has a larger volume than the second tank.

3. The passive cryogen storage system of claim 1, wherein the first and second tanks are cryogenic propellant tanks and the first tank is configured to hold a lower density cryogenic propellant at a lower temperature than the second tank.

4. The passive cryogen storage system of claim 1, wherein the first tank is configured to hold liquid hydrogen and the second tank is configured to hold liquid oxygen.

5. The passive cryogen storage system of claim 1, comprising load responsive multiple layer insulation covering the first and second tanks.

6. The passive cryogen storage system of claim 1, comprising integrated multiple layer insulation covering the first and second tanks.

7. The passive cryogen storage system of claim 1, wherein the first, second, third, and fourth struts comprise a carbon fiber modified cyanate ester prepreg resin composite.

8. The passive cryogen storage system of claim 1, wherein the first heat source comprises a spacecraft bus section and the second heat source comprises a spacecraft engine section.

9. The passive cryogen storage system of claim 1, used in combination with a subcooling system or cryocooler system for subcooling one or more of the first and second tanks while on the ground.

10. A passive cryogen storage system for a spacecraft comprising:
an insulating tank support structure including:
a first propellant tank with a first interface ring mounted thereto;
a second propellant tank with second and third interface rings mounted thereto;
a plurality of first struts coupling the first and second interface rings;

a first support ring surrounding and spaced apart from the first interface ring;

a plurality of second struts coupling the first support ring and the second interface ring;

a plurality of third struts coupling the first support ring and a spacecraft bus section; and a plurality of fourth struts coupling the third interface ring and a spacecraft engine section.

11. The passive cryogen storage system of claim 10, wherein the first propellant tank is interposed between the spacecraft bus section and the second propellant tank.

12. The passive cryogen storage system of claim 10, wherein the second propellant tank is interposed between the first propellant tank and the spacecraft engine section.

13. The passive cryogen storage system of claim 10, wherein the first and second propellant tanks are cryogenic propellant tanks, and the first tank is configured to hold a lower density cryogenic propellant at a lower temperature than the second tank.

14. The passive cryogen storage system of claim 10, wherein the first tank is configured to hold liquid hydrogen and the second tank is configured to hold liquid oxygen.

15. The passive cryogen storage system of claim 10, wherein the first and second tanks include a cover of load responsive multiple layer insulation.

16. The passive cryogen storage system of claim 10, wherein the first and second tanks include a cover of integrated multiple layer insulation.

17. The passive cryogen storage system of claim 10, wherein the first, second, third, and fourth struts comprise a carbon fiber modified cyanate ester prepreg resin composite.

18. The passive cryogen storage system of claim 10, used in combination with a cryogen subcooling system or cryocooler system for subcooling one or more of the first and second propellant tanks while on the ground.

* * * * *